Nov. 3, 1931.  A. DEWANDRE  1,830,530
VACUUM BRAKE
Filed Feb. 9, 1931  2 Sheets-Sheet 1

A. Dewandre
INVENTOR

Nov. 3, 1931.   A. DEWANDRE   1,830,530
VACUUM BRAKE
Filed Feb. 9, 1931   2 Sheets-Sheet 2
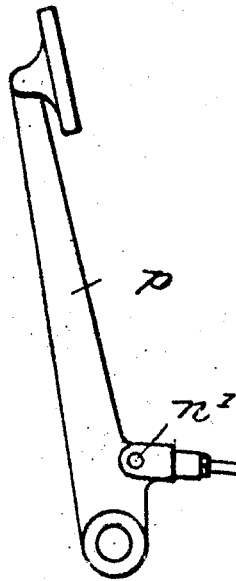
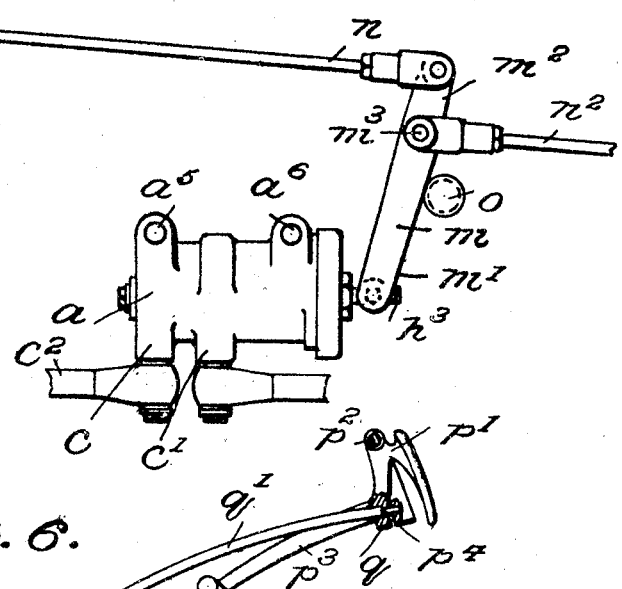
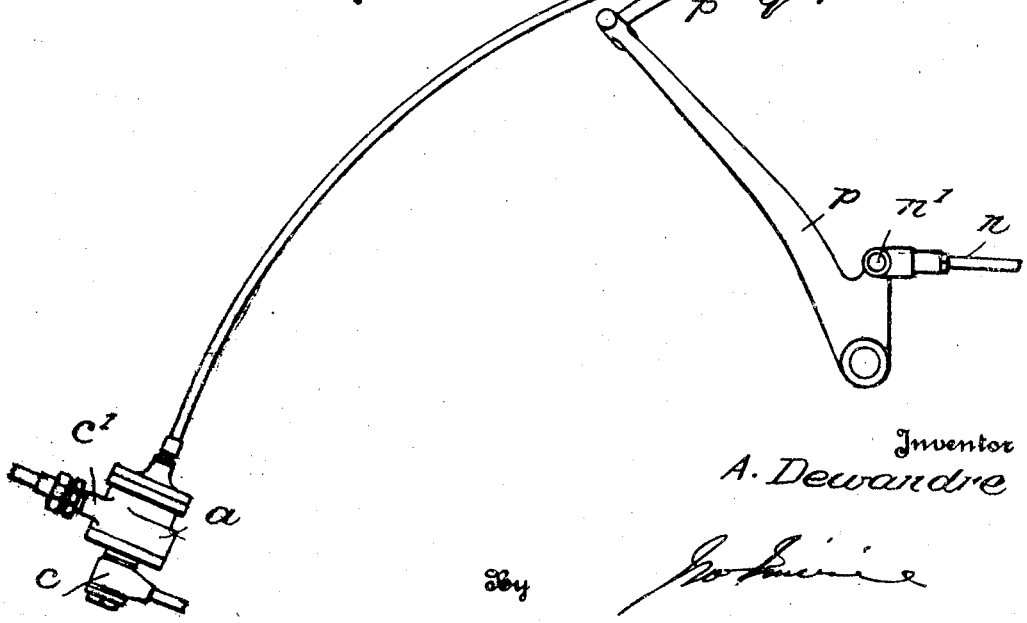
Fig. 5.
Fig. 6.
Inventor
A. Dewandre
By
Attorney Patented Nov. 3, 1931

1,830,530

UNITED STATES PATENT OFFICE

ALBERT DEWANDRE, OF BRUSSELS, BELGIUM

VACUUM BRAKE

Application filed February 9, 1931, Serial No. 514,529, and in Great Britain October 8, 1929.

My invention relates to vacuum braking systems more especially of the vacuum servo kind for vehicles wherein use is made of a vacuum cylinder containing a piston or equivalent which is operatively connected to the brakes, the partial vacuum for actuating the piston being derived say from the induction of an internal combustion engine and controlled by a pedal or other manually actuatable device which may be capable of acting directly upon the brakes.

It relates in particular to arrangements wherein a pneumatic relay or distributor comprises within a suitable housing a hollow sleeve valve for controlling the degree of suction existing in the brake cylinder and a disc-type atmospheric valve movable co-axially into engagement with a seating provided by the first valve to isolate the brake cylinder from the atmosphere and whose continued movement in the same direction opens said sleeve valve against resilient resistance, the disc valve being connected with a pedal or other deflectable operating member to which a reaction is applied under the action of differential pressures on the collected valves in the distributor proportional to the degree of braking. To enable grading to be obtained any displacement of either valve from its seat in response to change of position of the operating member has to be followed by some such action as reseats that valve when the suction in the brake cylinder, i. e. the braking, has reached its desired different degree and retains said valve in this position to maintain said degree so long as the operating member is kept in one position. In a prior arrangement such effect has been obtained by connecting the disc valve elastically, for instance through a spring, to the operating member. According to the present invention elastic connection is avoided and other means are adopted which enable more satisfactory employment and operation of this type of distributor.

The invention consists in a pneumatic relay or distributor of the type set forth with means for its operation comprising a non-elastic connection between the disc valve and the pedal or other operating member, which connection includes means adapted, with response of the brakes to movement of the operating pedal or the like, to reclose the valve affected by such movement.

The invention further consists in brake control apparatus according to the preceding paragraph wherein the disc valve is adapted, when no braking is required, to be held by a light resilient member clear of its seating on the sleeve valve and to be drawn by a spindle or other non-elastic member into contact with its seating during the first part of the movement of the operating means for brake application.

The invention further consists in apparatus according to either of the preceding paragraphs in which the operating means comprises a control member movable by the operator and adapted when moved to effect displacement of the disc valve in relation to the distributor housing through a pivotal connection which latter is positively connected with the brake linkage in such a way as to be moved thereby to follow up the movement of said control member to eliminate said displacement.

The invention further consists in apparatus in accordance with the preceding paragraph wherein the control member comprises a pedal or other lever pivotally connected to a floating lever which is also connected pivotally with the disc valve, and a further pivotal connection is made between another point of said floating lever and a member forming an integral part of the brake linkage.

The invention further consists in apparatus wherein the operating member comprises a pad or the like pivotally connected to a lever member and so operative upon a Bowden cable connected to the disc valve as to produce an alteration in the effective relative lengths of the outer and inner cable members and the desired displacement of the disc valve, the lever member being connected directly with the brake rodwork.

The invention further consists in apparatus according to any of the five preceding paragraphs wherein the respective areas of the vacuum valve port, of the release valve port, and of the piston formed by co-operation of the two valves are made equal or practically equal, substantially as described.

The invention also consists in the combination of a distributor with a vacuum brake cylinder having a piston or the like in operative connection with one or more brakes or sets of brakes, a pedal or equivalent means for operating the distributor and capable of acting the brakes directly, substantially as hereinafter described.

The invention further consists in improvements in or relating to vacuum braking substantially as hereinafter described with reference to the accompanying drawings.

Referring now to the accompanying drawings:—

Figure 5 is an elevation showing the essential parts of one suitable form of mechanism for the operation of distributor device shown in Figures 1 and 2.

Figure 6 is a view similar to Figure 5 but showing the distributor of Figures 3 and 4 and a different arrangement of operating means therefor.

Figure 1:
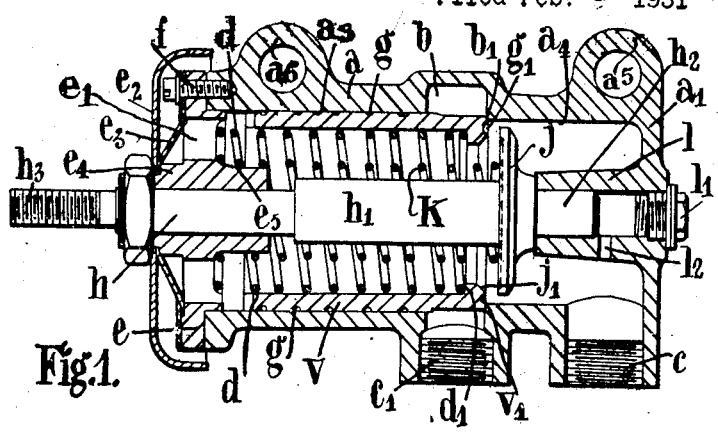
Figure 1 is a longitudinal section of one construction of distributor forming part of this invention and more particularly suitable for use in commercial or similar vehicles.
Figure 2:
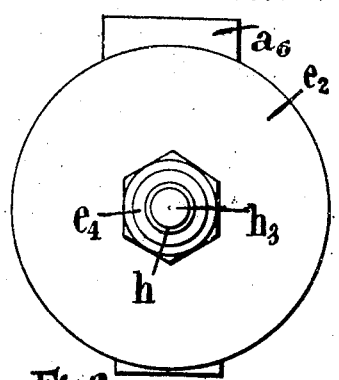
Figure 2 is a plan of the device shown in Figure 1.

In carrying the invention into effect in one form by way of example one construction of distributor device in the operation of which the operator may feel the extent of the braking is shown in Figures 1 and 2 and comprises a generally more or less cylindrical casting $a$ of which one end is closed at $a_1$. Rather less than midway of its length from the closed end $a_1$ the diameter of the casing is somewhat enlarged for a short distance axially so as to provide an internal annular space $b$ which axially separates the bore of the casing into two portions $a_3$ and $a_4$. The bore at $a_4$ is made slightly smaller than is the bore at $a_3$ and between the closed end $a_1$ of the casing and the shoulder $b_1$ in which the bore $a_4$ and the space $b$ meet a more or less radial branch $c$ is taken off for making connection to the vacuum cylinder or cylinders actuating the brakes. A like branch $c_1$ is provided on the other side of the shoulder, being connected to the engine induction or other suction source.

Adapted to slide in an airtight manner within the larger diameter bored part $a_3$ of the casing which lies to the same side of the internal shoulder $b_1$, as does the induction branch $c_1$, there is provided a hollow cylindrical sleeve $v$ having circumferential grooves $g$ and at its end adjacent the shoulder at $b_1$ a shallow inwardly directed flange or reduced diameter portion and a surface $v_1$ adapted to engage with the shoulder $b_1$ in the manner of a valve upon a valve seat by which latter term the shoulder $b_1$ will hereafter be referred to. When the sleeve is seated the annular space $b$ left round it to the induction side of the seat $b_1$ and connected with the induction branch will be defined internally by the lower part of the sleeve valve $v$ and when the end therof $v_1$ is seated on $b_1$ the chambers into which lead the ports $c$ and $c_1$ respectively will be isolated from one another. The sleeve $v$ is held against the seating $b_1$ by a helical compression spring $d$ of a suitable strength which is located inside the sleeve, engaging axially at one end with the back $d_1$ of the inturned end region of the sleeve $v$ and at the other end with a cap $e$ which is fitted and secured as by set screws $f$ to the open end of the casing after the sleeve $v$ and other internal parts have been placed in position.

The cap $e$ which is perforated at $e_1$ to ensure the interior of the sleeve being open to atmosphere and is provided with a protective cover $e_2$ and suitable dust filter $e_3$ is also provided centrally with a boss $e_4$ which extends axially outwards to form an attachment for the parts $e_2$, $e_3$ referred to, and also extends into the casing for some distance. The boss is bored to form a guide for a rod or stem $h$ which is sufficiently long to pass through the seat $b_1$ for the vacuum valve $v$ and adjacent that end of the stem there is provided a valve $j$ of mushroom or disc type and of such a diameter that it may be reciprocated freely within the bore $a_4$ of the casing and be drawn into fluid-tight seating engagement with the end surface $j_1$ radially within the concentric groove $g_1$ on the inturned end region of the sleeve $v$. This mushroom valve is to act as a release or atmospheric valve whereby atmospheric pressure may be admitted into the brake cylinder by way of the filter $e_3$, the perforations $e'$, and the hollow interior of the vacuum valve $v$.

Surrounding the release valve stem $h$ which is thickened at $h_1$ between the boss $e_4$ and the valve $j$ a light helical compression spring $k$ is provided with its opposite ends engaging respectively under the valve $j$ and against a step $e_5$ formed on the outside of the boss $e_4$ so as normally to hold the valve $j$ off its seat and retain it against a boss $l$ provided integral with and centrally of the end closure $a_1$ of the casing $a$, this boss being bored internally to receive an extension $h_2$ of the valve stem $h$ and provide a second guide co-operating with that provided by the boss $e_4$. The bore of the boss $l$ is closed endwise by a suitable plug $l_1$, a hole $l_2$ communicating between the bore and the outside of the boss $l$ permitting free reciprocation of the extension $h_2$. When so held against the boss $l_2$ the face of the release valve may lie any suitable and unusually short distance away from its seat $j_1$.

The release valve stem which protrudes through the cap of the casing is threaded or otherwise provided at $h_3$ conveniently for connection to a suitable operating member.

In one convenient way of applying and operating the distributor described above the casing $a$ is secured by the lugs $a_5$ and $a_6$ to the chassis of the vehicle and the valve stem $h$ is connected by its end $h_3$ as shown in Figure 5 to one end $m_1$ of a floating lever $m$, the other end $m_2$ of which is pivotally connected to a link rod $n$ which is in turn pivotally connected at $n_1$ to a suitable point on a brake pedal $p$. At an intermediate point $m_3$ of the lever $m$ say some three quarters of the distance along same from the pivot at $m_1$ towards the pivot at $m_2$ a further pivotal connection is provided this linking up the lever $m$ through the rod $n_2$ with the cross shaft from which the various brakes of the vehicle or part thereof are operated. With the parts in the position shown in Figure 5, that is when the brakes are released, the lever $m$ is held back by the return springs in the brake lines against a suitable stop $o$ and the internal parts of the distributor which is marked $a$ in Figure 5 are as shown in Figures 1 and 2 described above. When force is applied to the pedal and it is being first depressed the link or lever $m$, leaving the stop $o$, commences to pivot about the point $m_3$ and a pulling force is applied to the release valve stem. The release valve is caused then to move, against the light resilient resistance afforded by the spring $k$ into engagement with its seating $j_1$ at the end of the vacuum valve $v$. At the same time the brakes are being slightly pulled upon through the rod $n_2$. With release valve $j$ in this position the chamber of the casing connected via the branch $c$ and pipe $c_2$ to the vacuum or servo cylinder or cylinders which may be located at any suitable point for operating the brakes is isolated from the interior of the sleeve $v$ and therefore also isolated from atmospheric pressure. The pulling on the release valve stem being continued by further forward movement of the pedal $p$ the said valve carries with it the vacuum valve $v$ which is thus eased off and displaced from its seating $b_1$ against the action of the main spring $d$ and vacuum is admitted through the vacuum valve port into the brake cylinder, the brakes being thus applied.

The application of the brakes, however, results in immediate forward movement of the rod $n_2$, causing the pivot $m_3$ to follow the movement of the pedal pad and, through the lever $m$, to move back the release valve, reseat the valve $v$ and isolate the suction source and the atmosphere from the brake cylinder; and, by maintaining the desired degree of braking corresponding to the new position of and load upon the pedal, providing the requisite grading action.

The release valve $j$ when closed co-operates with the vacuum valve $v$ to form a natural piston of substantial area the effect of atmospheric pressure upon one side of which will determine the reaction experienced by the operator and for any given load on the pedal the vacuum in the brake cylinder will hold the vacuum valve against its seating, maintaining the required degree of vacuum.

In this connection it is to be noted that with the vacuum valve in contact with its seating the vacuum created by the induction in the annular space to that side of the vacuum valve seat has no effect upon that valve such as would tend either to open or to close it. Accordingly the effect of the induction vacuum does not have to be counteracted before the vacuum valve can be opened and there will be no jerking action or jumping of said valve from its seat. When operating the device, the only resistance to be overcome in opening the suction valve is the relatively smooth resistance due to the spring $d$ and that offered by the other or release valve spring $k$ which however is made so light as to be negligible.

Increase of load upon the operating means will again ease the vacuum valve from its seat resulting in a further increase of vacuum in the brake cylinder. Again, if load on the operating means be reduced, the vacuum valve being in engagement with its seating, the release valve will be eased off its seating under the co-operating actions of the light spring referred to and the vacuum existing at the time in the brake cylinder respectively and will reopen communication between the atmosphere and the brake cylinder providing a reduction in the braking vacuum proportionate to the reduction of load on the operating means, with reseating of the release valve under the return action of the brake work.

Figure 3:
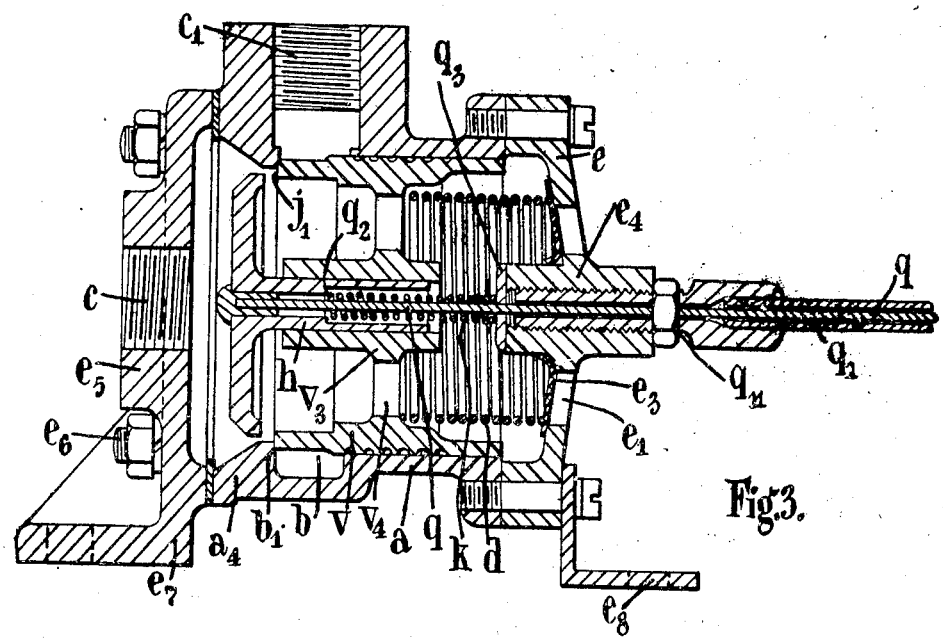
Figure 3 is a view corresponding to Figure 1 but of a modified construction of distributor more suitable for use with pleasure cars or cars of similar types.
Figure 4:
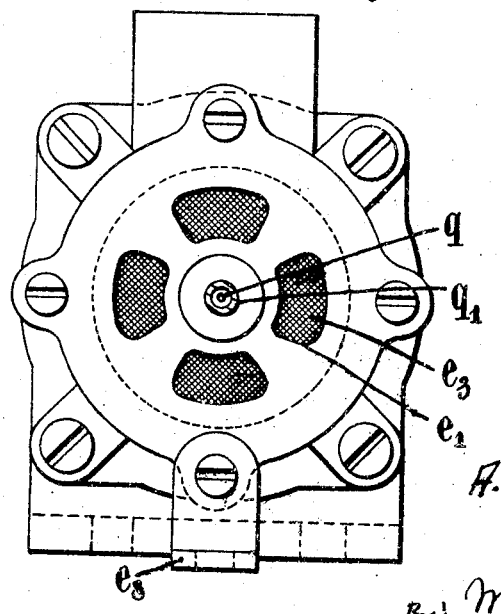
Figure 4 is a plan of the device shown in Figure 3.

In a modified construction of distributor which is shown in Figures 3 and 4 and operates in the same manner as that previously described the casing $a$ is open at both ends and is for rather more than one half of its length from one end of generally uniform diameter the remainder of its length being of an increased diameter subject to what is said hereafter. The smaller diameter part which is closed endwise by a cap $e$ of dished form provides internal accommodation for the vacuum valve sleeve $v$ while the enlarged diameter part provides the annular or vacuum chamber $b$ around the valve, an inwardly directed shoulder or thickened portion $a_4$ affording a region of smaller bore than the interior of the portion accommodating the valve $v$ and providing a suitable seating $b_1$ for said valve. In this form connection to the servo cylinder is made through a central opening $c$ which forms an end closure to the casing and is suitably secured by set screws or the like $e_6$ thereto. Integral with the cover $e_5$ is a bracket $e_7$ which co-operates with an angle bracket $e_8$, secured to the casing $a$ by one of the screws holding the other end cover $e$ in place, in providing for attachment of the device to the vehicle chassis. The sleeve valve $v$ in this instance is provided centrally with a boss $v_3$ which forms a guide for the stem $h$ of the atmospheric valve $j$. The latter is drawn into engagement with its seating $j_1$ by means of the inner member or wire $q$ of a Bowden type cable. The outer member $q_1$ of the Bowden is suitably fixed to the casing by being brought at $q_{11}$ into the interior of the central boss $e_4$ of the cap. The light return spring $k$ for the atmospheric valve is accommodated around the wire $q$ and partly within the hollow interior of the valve stem, abutting at one end against a shoulder $q_2$ and at the other against a washer $q_3$ covering the inner end of the cap boss $e_4$. The other spring $d$ for holding the vacuum valve $v$ against its seat abuts at one end with a filter $e_3$ which it also holds in place against the inside of the cap $e$ to cover the airholes $e_1$ and at the other end with the radial ribs or the like $v_4$ which connect the boss $v_3$ with the sleeve part. In the operation of the mechanism shown in Figure 6 and embodying the modified form of distributor last described use is made of a Bowden connection between the distributor and the brake pedal $p$. In this case the outer member $q_1$ of the Bowden is connected at its opposite ends respectively with the casing $a$ of the distributor and with a pad member $p_1$ adapted to swivel about a pivot $p_2$ provided on an extension $p_3$ of the pedal stalk $p$. The inner member or wire $q$ of the Bowden is connected at its opposite ends respectively to the atmospheric valve $j$ as already described and to an abutment $p_4$ fixed in relation to the pedal stalk. In this arrangement also the pedal $p$ is in direct mechanical connection with the brakes through the rod $n$ and is normally held back thereby under the action of the return springs; and the servo cylinder or cylinders is or are situated at any suitable position on the chassis. In operation the driver's foot is applied to the front of the pedal or pad $p_1$ and when force is applied the pad pivots about the point $p_2$ compressing the Bowden casing $q_1$ into a bowed shape, resulting in the wire $q$ being shortened in relation to the casing $q$ and pulling upwardly upon the atmospheric valve for the desired operation.

With application of the brakes in response to the depression of the pad, the rod $n$ moves forward and displaces the pedal stalk $p$ sufficiently to restore the cable to such position or shape as reseats the vacuum valve and maintains the degree of braking corresponding to the general position of the pedal and corresponding pressure of the operator's foot thereon.

In either of the arrangements described, controlling action is notably smooth and progressive due to the only very slight difference between the respective areas of the sleeve which constitutes the vacuum valve, of the vacuum valve port and of the release valve port.

The systems hereinbefore described provide as desirable for the direct application of the brakes by manual effort alone in the event of failure of vacuum, and when the latter is available afford the required reaction.

For obtaining a more exact progressive action when such may be required, the areas referred to may be made identical or more nearly so than in the device hereinbefore described. Thus the vacuum port may be enlarged to a diameter equal to the external diameter of the sleeve, the latter being also flanged outwardly by a suitable amount to provide a sufficient seating surface. Also the sleeve may be extended axially by a suitably reduced diameter or necked portion beyond the region providing the vacuum valve face and then opened out to provide an enlarged diameter part and seating for an enlarged exhaust valve, which seating may be accommodated readily in the enlarged diameter part of the casing to the brake cylinder side of the vacuum port. By such means the three areas referred to may be made equal to one another.

Other arrangements than those described are possible both as to the controlling device itself and to the methods and means whereby it may be utilized and operated and it is to be understood that modifications may be introduced and alterations made without departing in any way from the scope of the invention as herein claimed.

I declare that what I claim is:

1. A distributor for brake control apparatus including a casing open at one end to the atmoshere and formed adjacent the opposite end with a suction port in communication with a source of suction and a power port in communication with brake operating means responsive to suction, a sleeve slidable in the casing and open at one end to the atmosphere, said sleeve when in operative position serving to cut off the suction port from the interior of the casing, a valve closing one end of the sleeve, means for normally holding the valve open to provide communication between the power port and atmosphere, and manually operable means for closing the valve to cut off such atmospheric communication and thereafter and solely through the valve as an operating member serving to actuate the sleeve to establish communication between the suction port and power port.

2. A distributor for brake control apparatus comprising a casing open at one end to the atmosphere and formed at the opposite end with a suction port and power port, a sleeve slidable longitudinally of the casing and interiorly open to the atmosphere, means for normally holding the sleeve in position to cut off communication between the suction port and power port, a valve cooperating with that end of the sleeve opposite the atmospheric inlet of the casing, said valve when in operative position closing the power port against the atmosphere, means for normally holding the valve in open position, and manually operable means for operating the valve to closed position and thereafter and through said valve as an actuator moving the sleeve to open the suction port to the interior of the casing.

3. A distributor for brake control apparatus including a casing open at one end to the atmosphere and formed at the opposite end with a power port leading to a brake operating apparatus, said casing being further formed intermediate the atmospheric opening and power port with a suction port in communication with a source of suction, a sleeve slidably mounted in the casing and open at one end to the atmosphere, the opposite end of the sleeve serving, when the sleeve is in operative position, to cut off communication between the suction port and the interior of the casing, means for normally holding the sleeve in operative position, a valve closing one end of the sleeve to thereby cut off communication between the interior of the sleeve and the power port, means for normally holding the valve in open position, and a manually operable member directly connected to the valve and serving when operated to initially close the valve, said valve when closed serving as a means to cause said member to move the sleeve to a position to open the suction port to the interior of the casing.

4. A distributor for brake control apparatus including a casing open at one end to the atmosphere and formed at the opposite end with a power port leading to a brake operating apparatus, said casing being further formed intermediate the atmospheric opening and power port with a suction port in communication with a source of suction, a sleeve slidably mounted in the casing and open at one end to the atmosphere, the opposite end of the sleeve serving, when the sleeve is in operative position, to cut off communication between the suction port and the interior of the casing, means for normally holding the sleeve in operative position, a valve closing one end of the sleeve to thereby cut off communication between the interior of the sleeve and the power port, means for normally holding the valve in open position, and a manually operable member directly connected to the valve and serving when operated to initially close the valve, said valve when closed serving as a means to cause said member to move the sleeve to a position to open the suction port to the interior of the casing, the means for normally holding the sleeve in operative position preventing movement of said sleeve from the operative position until after the valve has been moved to closed position with respect to the sleeve.

5. A distributor for brake control apparatus including a casing open at one end to the atmosphere and formed at the opposite end with a power port leading to a brake operating apparatus, said casing being further formed with a port open to a source of suction and communicating with the power port through the interior of the casing for the operation of the power apparatus, a sleeve slidable in the casing and open at one end to the atmospheric opening of the casing, the opposite end of the sleeve serving as a cut-off for the suction port against the interior of the casing when the sleeve is in operative position, means for holding the sleeve in operative position, a valve cooperating with that end of the sleeve opposite the atmospheric opening, means for normally holding the valve in open relation to the casing to thereby establish communication between the atmosphere and power port through the sleeve, and a manually operable member connected to the valve and extended through the sleeve and casing, said member initially acting to close the valve against the sleeve to thereby interrupt atmospheric connection between the power port and atmosphere, the contact of the valve with its seat insuring, in the further movement of the manually operable member, a movement of the sleeve to open the exhaust port to the interior of the casing and thereby to the power port.

6. A distributor as defined in claim 5, wherein the means for holding the sleeve in operative position and the means for holding the valve in normally open position are springs housed wholly within the sleeve and of relatively different strengths.

7. A distributor as defined in claim 5, wherein protecting means is provided for the end of the casing open to the atmosphere, said means including a filter section.

ALBERT DEWANDRE.